United States Patent
Evans

(10) Patent No.: US 10,570,976 B1
(45) Date of Patent: Feb. 25, 2020

(54) REVERSIBLE TWO SETTING PRELOAD SPACER

(71) Applicant: ICON VEHICLE DYNAMICS LLC, Riverside, CA (US)

(72) Inventor: Dylan Samuel Evans, Corona, CA (US)

(73) Assignee: ICON VEHICLE DYNAMICS LLC, Riverside, CA (US)

( * ) Notice: Subject to any disclaimer, the term of this patent is extended or adjusted under 35 U.S.C. 154(b) by 0 days.

(21) Appl. No.: 15/920,104

(22) Filed: Mar. 13, 2018

Related U.S. Application Data

(60) Provisional application No. 62/471,268, filed on Mar. 14, 2017.

(51) Int. Cl.
| | |
|---|---|
| *F16F 1/13* | (2006.01) |
| *F16F 1/12* | (2006.01) |
| *B60G 15/04* | (2006.01) |
| *B60G 7/02* | (2006.01) |
| *B60G 15/06* | (2006.01) |

(52) U.S. Cl.
CPC .................. *F16F 1/13* (2013.01); *B60G 7/02* (2013.01); *B60G 15/04* (2013.01); *B60G 15/063* (2013.01); *F16F 1/121* (2013.01); *B60G 2204/4402* (2013.01)

(58) Field of Classification Search
CPC .. F16F 1/13; F16F 1/121; B60G 15/04; B60G 2204/4402; B60G 15/063
USPC ........................................ 267/218, 195, 217
See application file for complete search history.

(56) References Cited

U.S. PATENT DOCUMENTS

| | | | | |
|---|---|---|---|---|
| 3,043,581 A | * | 7/1962 | Schmidt ............... | B60G 15/063 267/218 |
| 3,181,852 A | * | 5/1965 | Paller ...................... | B60G 7/04 267/218 |
| 3,603,575 A | * | 9/1971 | Arlasky ............... | B60G 17/021 267/34 |
| 3,877,687 A | * | 4/1975 | Sarti ...................... | B60G 15/02 267/195 |
| 4,030,713 A | * | 6/1977 | Palmer ................. | B60G 15/063 188/314 |

(Continued)

FOREIGN PATENT DOCUMENTS

| | | | | |
|---|---|---|---|---|
| DE | 10009213 A1 | * | 9/2001 | .......... B60G 15/063 |
| FR | 1059988 A | * | 3/1954 | .......... B60G 15/063 |
| JP | 58170938 A | * | 10/1983 | .......... B60G 17/021 |

OTHER PUBLICATIONS

EPO machine translation FR 1059988 A, Mar. 1954. (Year: 1954).*

*Primary Examiner* — Thomas J Williams

(74) *Attorney, Agent, or Firm* — Knobbe, Martens, Olson & Bear, LLP

(57) ABSTRACT

A reversible, two setting preload spacer includes a body extending along an axis between a first end and a second end. The spacer also includes an opening formed through the body and extending along the axis from the first end to the second end. The opening is defined by an inner surface and configured to receive a portion of a shock tube of a shock absorber. The spacer also includes an engagement structure configured to engage a groove on the shock tube positioned on the inner surface. The engagement structure is positioned such that a first distance between the engagement structure and the first end is greater than a second distance between the engagement structure and the second end.

15 Claims, 14 Drawing Sheets

(56) References Cited

U.S. PATENT DOCUMENTS

| | | | | |
|---|---|---|---|---|
| 4,079,922 | A | * | 3/1978 | Nicholls .............. B60G 15/063 267/218 |
| 4,183,509 | A | * | 1/1980 | Nishikawa ........... B60G 15/063 188/319.2 |
| 4,366,969 | A | * | 1/1983 | Benya .................. B60G 15/063 267/117 |
| 4,458,605 | A | * | 7/1984 | Herring, Jr. ................ B61F 5/34 105/197.05 |
| 5,553,713 | A | * | 9/1996 | Sydekum ............. B60G 15/063 267/175 |
| 5,803,443 | A | * | 9/1998 | Chang .................. B60G 15/063 267/177 |
| 7,896,321 | B2 | * | 3/2011 | Nakashima ........... F16F 13/007 267/175 |
| 8,733,744 | B2 | * | 5/2014 | Kerr ...................... F16F 9/3271 267/136 |
| 2009/0189360 | A1 | * | 7/2009 | Fritz .................... B60G 15/063 280/5.519 |
| 2013/0106038 | A1 | * | 5/2013 | Miyamoto ........... B60G 15/063 267/286 |

* cited by examiner

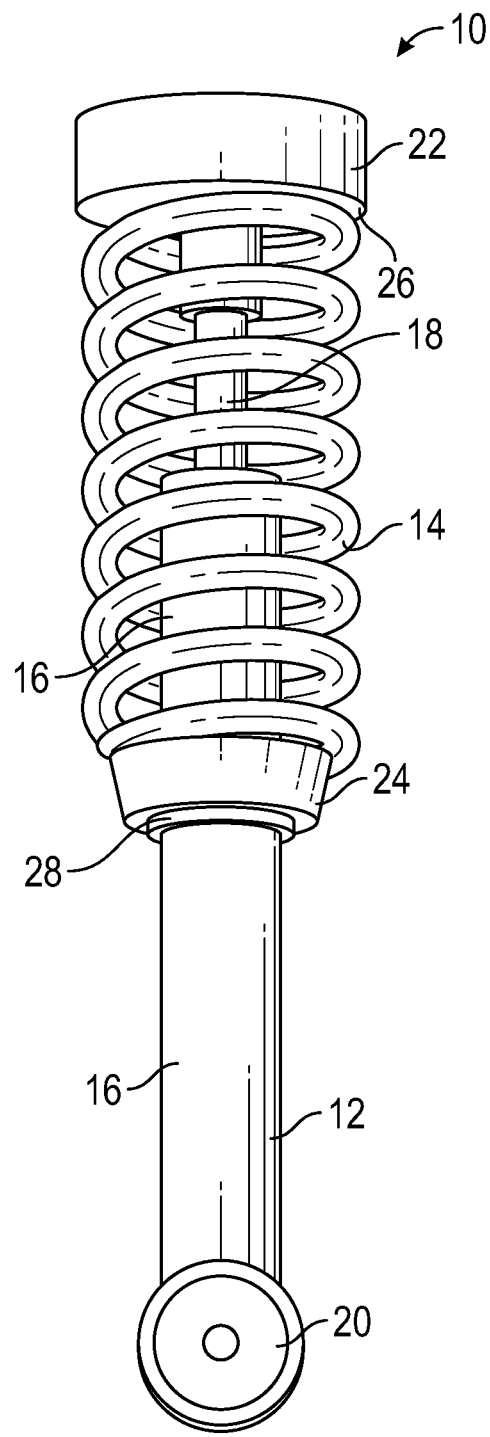
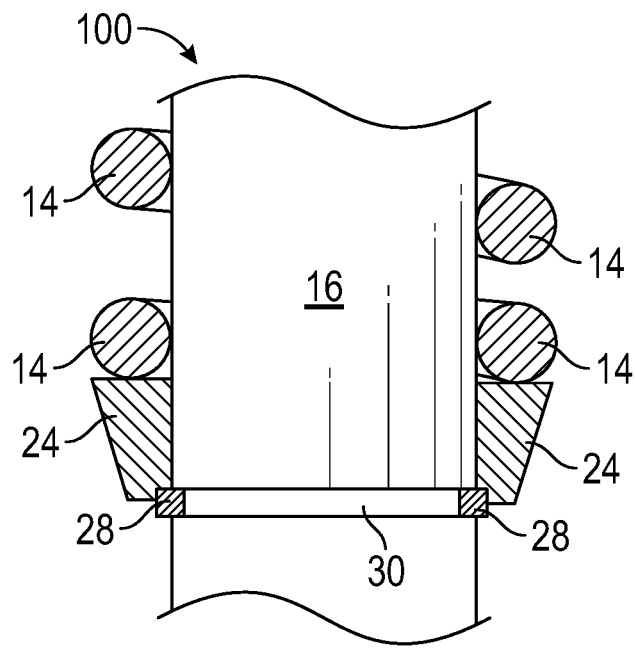
FIG. 1A
FIG. 1B

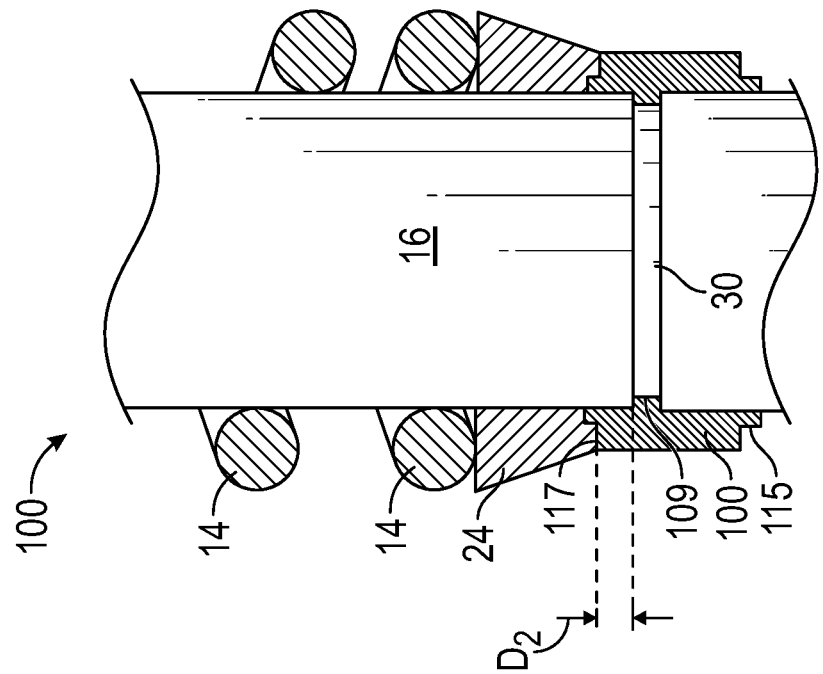
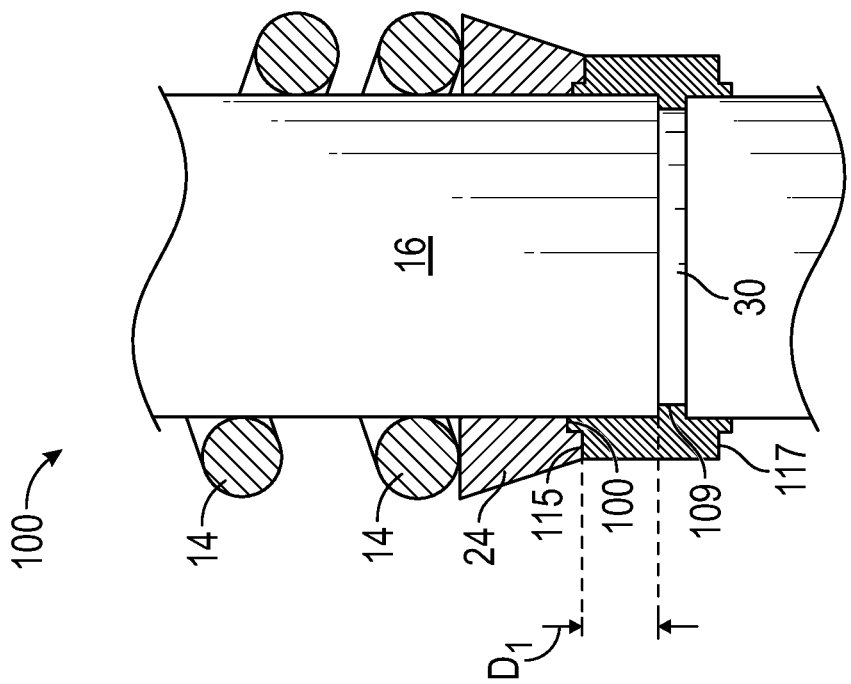

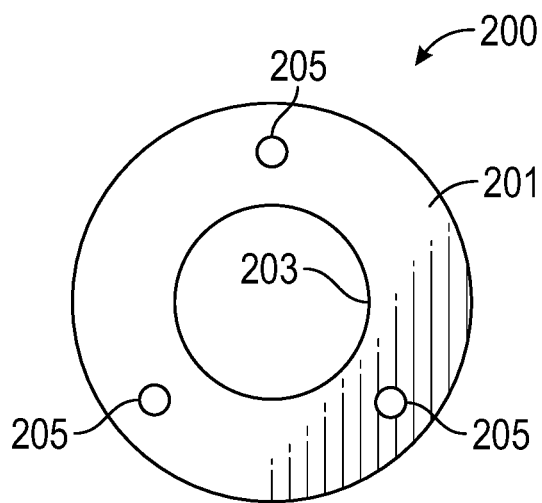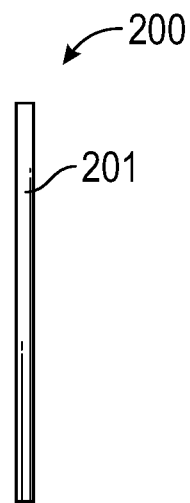
FIG. 8A  FIG. 8B
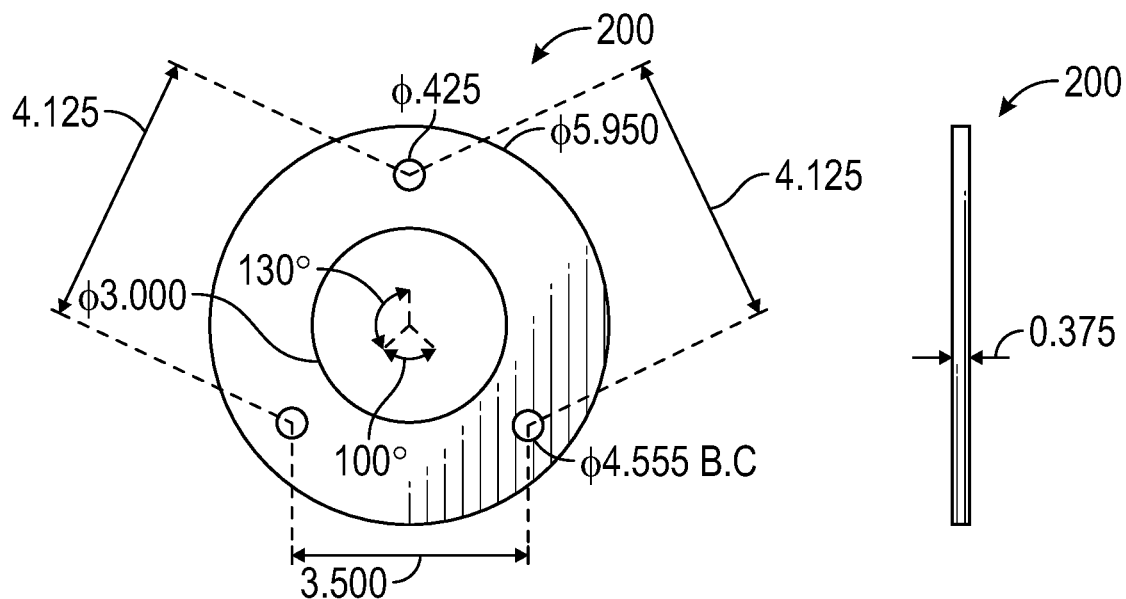
FIG. 9

REVERSIBLE TWO SETTING PRELOAD SPACER

INCORPORATION BY REFERENCE TO ANY PRIORITY APPLICATIONS

This application claims priority to U.S. Provisional Application No. 62/471,268, filed Mar. 14, 2017, which is incorporated herein by reference. Any and all applications for which a foreign or domestic priority claim is identified in the Application Data Sheet as filed with the present application are hereby incorporated by reference under 37 CFR 1.57.

BACKGROUND OF THE INVENTION

Field

This application relates to suspension components for vehicles, and in particular, to preload spacers and/or adjustment collars for coilover shock absorbers.

Description

Suspension systems are used in many types of vehicles, including trucks, cars, vans, ATVs, motorcycles, dirt bikes, bicycles, and many other motorized and non-motorized vehicles. A suspension system is designed to dampen inputs caused by road surface irregularities, help maintain tire contact with the road, and perform other functions that improve the stability and comfort of the vehicle's ride. A suspension system can include springs, shock absorbers, and various other mechanical linkages that connect a vehicle to its wheels and allow relative motion between the vehicle and the wheels.

A shock absorber is commonly used with a spring. The shock absorber limits excessive suspension movement and dampens spring oscillations. A coilover shock absorber combines the shock absorber with the spring. A coilover shock absorber is an assembly with a coil spring encircling a shock absorber. Often, the shock absorber and spring are assembled as a single unit. Coilover shock absorbers are common in automotive cars, trucks, and motorcycle suspensions as original equipment (OE) and can also be installed as an aftermarket option. An advantage of a coilover shock absorber is that because the spring and the shock absorber are combined in a single assembly, vehicle weight can be reduced.

SUMMARY

This application describes preload spacers, collars, or perches (referred to generally throughout as "preload spacers") that can be installed on a coilover shock absorber or strut to adjust the compression or preload of a spring. By adjusting the compression or preload of the spring, the preload spacers can be used to adjust, set, or change the ride height of the vehicle. The preload spacers can be configured so that they can be installed in a first orientation that provides a first setting of compression or preload or a second orientation that provides a second setting of compression or preload. In some embodiments, the first setting changes (e.g., increases) the ride height of the vehicle by a first height and the second setting changes the ride height of the vehicle by a second height.

The preload spacers can be reversible such that in the first orientation a first side of the preload spacers is oriented upwardly and in the second orientation a second side of the preload spacers, opposite the first side, is oriented upwardly. In some embodiments, the preload spacers can include a symmetrical outer profile and an asymmetrical inner profile. A portion of the outer profile can engage with the spring perch to cause compression or preload of the spring. A portion of the inner profile can engage with a portion of a shock tube of the shock absorber. The portion of the inner profile that engages with the portion of the shock tube can be asymmetrically positioned along the inner profile of the preload spacer. For example, the portion of the inner profile that engages with the portion of the shock tube can be off-center such that the first and second orientations produce first and second settings of compression or preload, which correspond to first and second changes (e.g., increases) in ride height. In some embodiments, the preload spacers can be provided as an aftermarket part that can be installed with factory or aftermarket coilover shock absorbers or struts.

In some examples, a kit including the preload spacer can also include a shim (e.g., a top shim). A user can install the shim alone or the spacer in either orientation with or without the shim to achieve a desired ride height. Such a kit can allow for five different settings (preloads or compressions causing different ride heights) depending upon how the kit is installed. For example, installing the shim alone can achieve a first setting; installing the preload spacer in the first orientation without the shim can achieve a second setting; installing the preload spacer in the first orientation with the shim can achieve a third setting; installing the preload spacer in the second orientation without the shim can achieve a fourth setting; and installing the preload spacer in the second orientation with the shim can achieve a fifth setting. In an embodiment, the first through fifth settings are configured to, respectively, increase ride height by 0.5 inches, 1.0 inches, 1.50 inches, 1.75 inches, and 2.25 inches.

In a first aspect, a preload spacer device is disclosed. The device includes a body extending along an axis between a first end and a second end; an opening formed through the body extending along the axis from the first end to the second end, the opening defined by an inner surface and configured to receive a portion of a shock tube of a shock absorber; and an engagement structure configured to engage a groove on the shock tube positioned on the inner surface such that a first distance between the engagement structure and the first end is greater than a second distance between the engagement structure and the second end.

In another aspect, a reversible, two setting preload spacer for adjusting vehicle ride height is disclosed. The preload spacer includes a body extending along an axis between a first end and a second end, wherein the body is formed by a first portion and a second portion configured to be attached together. The preload spacer includes an opening formed through the body extending along the axis from the first end to the second end, the opening defined by an inner surface of each of the first portion and the second portion and configured to receive and contact portion of a shock tube of a coilover shock absorber. The preload spacer includes an engagement structure formed on the inner surface of each of the first portion and the second portion, the engagement structure configured to engage a groove on the shock tube to prevent the body from moving along an axis of the shock tube, the engagement structure positioned on the inner surface of each of the first portion and the second portion such that a first distance between the engagement structure and the first end is greater than a second distance between the engagement structure and the second end. The preload spacer is configured such that, when installed in a first orientation, the first end contacts a spring perch of the coilover shock absorber to cause a first increase in vehicle ride height, and when the preload spacer is installed in a second orientation, the second end contacts a spring perch of the coilover shock absorber to cause a second increase in vehicle ride height.

In some embodiments, a first profile of the first end and a second profile of the second end are symmetric across a plane normal to the axis. In some embodiments, the first end and the second end are configured to alternately engage a lower spring perch of the shock absorber. In some embodiments, the engagement structure comprises an annular protrusion extending from the inner surface. In some embodiments, the protrusion comprises a rectangular cross-sectional profile. In some embodiments, the protrusion comprises a square cross-sectional profile. In some embodiments, the protrusion comprises a rounded cross-sectional profile. In some embodiments, the body comprises a first portion and a second portion, and the first portion can be attached to the second portion by one or more fasteners. In some embodiments, the first portion comprises a first semicircular shape, and wherein the second portion comprises a second semicircular shape. In some embodiments, the device is reversible such that it can be installed on the shock tube in a first orientation, wherein the first end faces a first direction, and a second orientation, wherein the second end faces the first direction. In some embodiments, in the first orientation, the first end engages a lower spring perch of the shock absorber, and, in the second orientation, the second end engages the lower spring perch of the shock absorber. In some embodiments, in the first orientation, the device spaces the spring perch a first distance above the groove, and, in the second orientation, the device spaces the spring perch a second distance above the groove. In some embodiments, the shock absorber comprises a coilover shock absorber or a strut.

In another aspect a system for adjusting a ride height of a vehicle is disclosed. The system can include a coil over shock absorber having a spring, a shock body extending at least partially through the spring, and a lower spring perch supporting one end of the spring. The system can also include a reversible preload spacer configured to selectively engage with the shock body in a first orientation or a second orientation, wherein, in the first orientation, the preload spacer provides a first amount of preload for the spring, and wherein, in the second orientation the preload spacer provides a second amount of preload for the spring, the second amount different than the first amount.

In some embodiments, the preload spacer comprises an opening configured to receive the shock body. In some embodiments, the shock body comprises a groove formed in an outer surface of the shock body, and the preload spacer comprises an engagement structure configured in size and shape to engage the groove in both the first orientation and the second orientation. In some embodiments, the preload spacer comprises a body having a first end and an opposite second end, and in the first orientation the first end contacts the lower spring perch and in the second orientation the second end contacts the lower spring perch. In some embodiments, the engagement structure is positioned on body such that a first distance between the engagement structure and the first end is greater than a second distance between the engagement structure and the second end. In some embodiments, the engagement structure comprises an annular protrusion extending from the inner surface. In some embodiments, the protrusion comprises a rectangular cross-sectional profile. In some embodiments, the protrusion comprises a square cross-sectional profile. In some embodiments, the protrusion comprises a rounded cross-sectional profile. In some embodiments, the body comprises a first portion and a second portion, and the first portion can be attached to the second portion by one or more fasteners. In some embodiments, the first portion comprises a first semicircular shape, and wherein the second portion comprises a second semicircular shape. In some embodiments, the system further comprises a shim, wherein the shim comprises a disc having a thickness configured to be installed between the coilover shock absorber or strut and a shock tower.

In another aspect, a method for adjusting the ride height of a vehicle is disclosed. The method can include one or more of the following: compressing a spring of a coilover shock absorber or strut; removing a clip that supports a lower spring perch of the coilover shock absorber or strut; installing a reversible spacer onto the coilover shock absorber or strut in either a first orientation or a second orientation; and/or releasing the compression on the spring.

In some embodiments, installing the reversible spacer comprises selecting either the first orientation or the second orientation. In some embodiments, installing the reversible spacer in either the first orientation or the second orientation comprises positioning a first end of the reversible spacer toward the lower spring perch or positioning a second end of the reversible spacer toward the lower spring perch, respectively. In some embodiments, installing the reversible spacer comprises engaging a protrusion of the reversible spacer with a groove from which the clip was removed. In some embodiments, installing the reversible spacer comprises attaching a first portion of the reversible spacer to a second portion of the reversible spacer with one or more fasteners. In some embodiments, the method further includes installing a shim between the coilover shock absorber or strut and a shock tower of the vehicle.

In another aspect a kit or system that includes one or more preload spacers and one or more shock tower shims is disclosed. The preload spacer may be a reversible, two setting preload spacer that can be installed in either a first or second orientation as described herein. In some embodiments, the kit or system also includes mounting hardware. In some embodiments, the kit or system can be used to achieve five levels of vehicle ride height adjustment. For example, a first increase in vehicle ride height is possible by using the preload spacer in the first orientation without the shock tower shim; a second increase in vehicle ride height is possible by using the preload spacer in the first orientation with the shock tower shim; a third increase in vehicle ride height is possible by using the preload spacer in the second orientation without the shock tower shim; a fourth increase in vehicle ride height is possible by using the preload spacer in the second configuration with the shock tower shim; and a fifth increase in vehicle ride height can be achieved by using the shock tower shim alone (i.e., without the preload spacer).

The foregoing is a summary and contains simplifications, generalizations, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 1A is an isometric view of an embodiment of a coilover shock absorber.

FIG. 1B is a partial cross-sectional view of a portion of the coilover shock absorber of FIG. 1A that shows an embodiment of the lower spring perch.

FIG. 7B is a partial cross-sectional view of a portion of the coilover shock absorber of FIG. 7A that shows the preload spacer installed in a first orientation providing a first preload setting.

FIG. 7C is a partial cross-sectional view of a portion of the coilover shock absorber of FIG. 7A that shows the preload spacer installed in a second orientation providing a second preload setting.

FIG. 8A is a top view of an embodiment of a shock tower shim that can be used with some embodiments of preload spacers.

FIG. 8B is a side view of the shock tower shim of FIG. 8A.

FIG. 9 shows top and side views of an embodiment of a shock tower shim that can be used with some embodiments of preload spacers.

DETAILED DESCRIPTION

Figure 2:
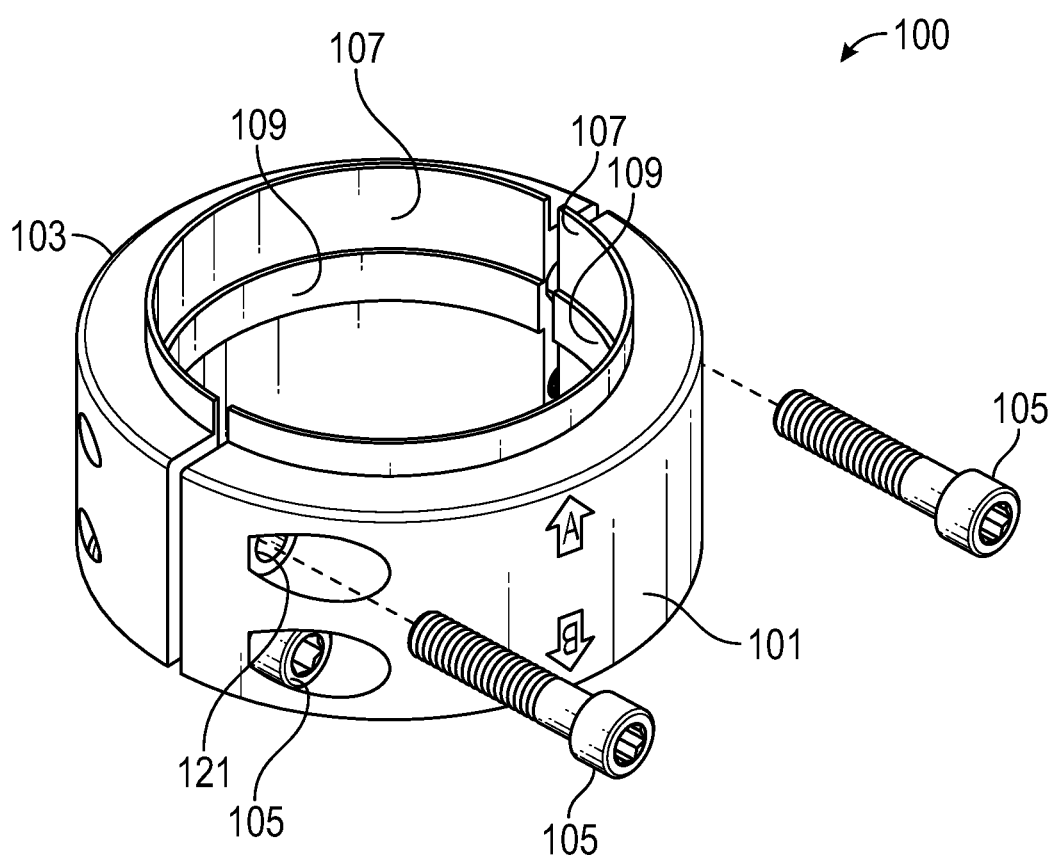
FIG. 2 is an isometric view of an embodiment of a reversible, two setting preload spacer that can be used with a coilover shock absorber.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made a part of this disclosure.

FIG. 1A is an isometric view of an embodiment of a coilover shock absorber 10. Although this disclosure uses a coilover shock absorber as the primary example, those of skill in the art will understand that the devices, methods, and systems described herein can also be used with a strut. A strut is similar to a coilover shock absorber, but can add the function of guiding the path of the wheel. A strut can be similar to a coilover shock absorber in regards to its damping and suspension functions. Accordingly, it will be understood that any reference to a coilover shock absorber in this application can also refer to a strut. The coilover shock absorber 10 can be used in a suspension system of many types of vehicles including trucks, cars, vans, ATVs, motorcycles, dirt bikes, bicycles, and many other motorized and non-motorized vehicles. In the illustrated example, the coilover shock absorber 10 includes a shock absorber 12 and a coil or spring 14. The spring 14 is positioned around at least a portion of the shock absorber 12 such that the shock absorber 12 extends through the spring 14. In use, the coilover shock absorber 10 is installed as part of the suspension system of the vehicle and extends between the vehicle and the wheel. The spring 14 can absorb deflections of the wheel rather than pass them on to the vehicle. The shock absorber 12 mechanically dampens the oscillations of the spring 14.

The shock absorber 12 can be a mono-tube shock absorber, a twin-tube shock absorber, a gas charged twin-tube shock absorber, a position sensitive damping (PSD) shock absorber, an acceleration sensitive damping (ASD) shock absorber, or any other type of shock absorber. The shock absorber 12 includes a body, housing, cylinder, or shock tube 16. The shock tube 16 can define an internal reservoir for a fluid, such as oil. A piston (not shown) is disposed within the internal reservoir of the shock tube 16 and is connected to a piston rod 18, which extends through a seal in an end of the shock tube 16. The piston and piston rod 18 are configured to move relative to the shock tube 16. As the piston moves through the fluid in the reservoir it provides damping.

The coilover shock absorber 10 includes mounts 20, 22 that can be connected to other components of the suspension system or vehicle when installed. In the illustrated embodiment, a lower mount 20 is positioned on a distal end of the shock tube 16 and an upper mount 22 is positioned on a proximal end of the piston rod 18. Thus, the coilover shock absorber 10 absorbs and dampens motions and impulses between the mounts 20, 22.

The spring 14 is positioned between spring perches 24, 26. In the illustrated embodiment, a lower spring perch 24 supports a distal end of the spring 14, and an upper spring perch 26 supports a proximal end of the spring 14. The lower spring perch 24 can be a ring or collar positioned annularly around the shock tube 16. In some embodiments, the lower spring perch 24 can be supported from below by a snap ring, retaining ring, circlip, or clip 28, for example, as illustrated in FIGS. 1A and 1B. As shown in FIG. 1B, the clip 28 can fit into a groove 30 that is formed in the outer surface of the shock tube 16. The clip 28 prevents the lower spring perch 24 from being pushed downwardly along the shock tube 16 by the spring 14. Thus, the spring 14 is compressed between the spring perches 24, 26.

FIG. 1B is a partial cross-sectional view of a portion of the coilover shock absorber 10 that shows a detail view of the lower spring perch 24. In the partial cross-sectional view of FIG. 1B, the spring 14, lower spring perch 24, and the clip 28 are illustrated as cut along a central longitudinal plane of the coilover shock absorber 10. As shown, the groove 30 is formed into the outer surface of the shock tube 16. In the illustrated embodiment, the groove 30 is shown as a rectangular groove, although other shapes for the groove 30 are possible including, for example, square or rounded grooves. The clip 28 is at least partially received in the groove 30. The shape of the clip 28 can be configured to correspond with the shape of the groove 30. For example, if the groove 30 has a rectangular profile, the clip 28 can have a corresponding rectangular profile. A portion of the clip 28 extends outwardly from the groove 28 to create a flange that supports the lower spring perch 24. As noted previously, the clip 28 prevents the lower spring perch 24 from being pushed downwardly along the shock tube 16 by the spring 14. In some embodiments, the groove 30 can comprise a plurality of grooves.

The compression or preload of the spring 14 of the coilover shock absorber 10 can be determined in part based on the position of the lower spring perch 24 relative to the shock tube 16. For example, if the lower spring perch 24 is positioned higher along the shock tube 16, the spring 14 can be more compressed or have a greater preload than when the lower spring perch 24 is positioned lower along the shock tube 16. However, in the coilover shock absorber 10 of FIGS. 1A and 1B, the position of the lower spring perch 24 along the shock tube 16 is determined by the position of the groove 30. In the illustrated embodiment, the lower spring perch 24 is positioned directly on top of the groove 30 and cannot be adjusted. Thus, the coilover spring 10 illustrated in FIGS. 1A and 1B does not provide any adjustability for the compression or preload of the spring 14 nor of the ride height of the vehicle.

FIG. 2 is an isometric view of an embodiment of a reversible, two setting preload spacer (or adjustment collar) 100 that can be used, for example, with the coilover shock absorber 10 (or a strut). The preload spacer 100 can be installed on the coilover shock absorber 10 to provide additional compression or preload for the spring 14, which can cause a corresponding change in vehicle ride height. In some embodiments, the preload spacer 100 is installed in place of the clip 28 and is used to support and position the lower spring perch 24 relative to the shock tube 16. As will be described in greater detail below, in some embodiments, the preload spacer 100 can be configured to provide two different compression or preload settings. In some embodiments, the preload spacer 100 is reversible, such that the preload spacer 100 provides a first setting or degree of compression or preload when installed in a first orientation and provides a second setting or degree of compression or preload when installed in a second orientation. In some embodiments, when installed, the preload spacer 100 can affect the ride height of the vehicle. For example, when installed in the first orientation, the preload spacer 100 can change (for example, increase) the ride height of the vehicle by a first height, and when installed in the second orientation, the preload spacer 100 can change the ride height of the vehicle by a second height.

As shown in FIG. 2, the preload spacer 100 can include body having a first portion 101 and a second portion 103. The first portion 101 can be attached to the second portion 103 by one or more fasteners, such as the two bolts 105 illustrated. Other types and numbers of fasteners are possible. In the illustrated embodiment, four bolts 105 are used, although other numbers of bolts 105 can be used in other embodiments (see, for example, the embodiment of FIG. 4B that uses two bolts 105). Other methods for attaching the first portion 101 to the second portion 103 can also be used, including for example a heavy duty hose clamp or circlip. In some embodiments, first ends of the first portion 101 the second portion 103 are attached with a hinge and second ends of the first portion 101 and the second portion 103 are attachable with a fastener such as a bolt or clasp. In some embodiments, the first and second portions 101, 103 are configured to fit around the shock tube 16. In some embodiments, the first and second portions 101, 103 each comprise a semicircular shape, such as a C-shape, for example, as illustrated in FIG. 2. In some embodiments, more than two portions are used, and each portion comprises an arcuate shape that when combined with the other portions forms the preload spacer 100 in the shape of an annular ring.

As will be described in greater detail below, the first portion 101 and the second portion 103 can be installed around the shock tube 16 of the coilover shock absorber 10 and used to space the lower spring perch 24 above the groove 30. As such, when the first portion 101 is attached to the second portion 103, the preload spacer 100 has the shape of an annular ring that is configured in size and shape to surround the shock tube 16. That is, an inner diameter of the preload spacer 100 can be configured to correspond with an outer diameter of the shock tube 16. The preload spacer 100 can be provided with a wide range of inner diameters that correspond to the various outer diameters of different shock tubes 16 in various coilover shock absorbers 10. As such, the preload spacer 100 can be configured for use with a wide variety of different sized coilover shock absorbers 10.

An inner surface 107 of the preload spacer 100 (including an inner surface of the first portion 101 and the second portion 103) includes an engagement structure 109. A portion of the engagement structure 109 is formed on each of the first portion 101 and the second portion 103 of the preload spacer 100. The engagement structure 109 is configured in size and shape to correspond and engage with the groove 30 of the shock tube 16. Accordingly, in some embodiments, the engagement structure 109 is a flange or protrusion extending from the inner surface 107 of the preload spacer 100 that is configured to be received at least partially within the groove 30 when the preload spacer 100 is installed on the shock tube 16. Again, the preload spacer 100 can be provided with a wide range of engagement structures 109 that correspond to the various shapes of grooves 30 on different types of coilover shock absorbers 10. For example, as noted previously, the groove 30 can comprise a rectangular, square, or rounded groove. Accordingly, in various embodiments, the engagement structure 109 of the preload spacer 100 can be provided with a corresponding shape, for example, a rectangular, square, or rounded protrusion. As such, the preload spacer 100 can be configured for use with a wide variety of different types and sizes of coilover shock absorbers 10 by selecting a preload spacer 100 that has an inner diameter and engagement structure 109 that correspond to the outer diameter and groove 30, respectively, of a coilover shock absorber 10.

In some embodiments, the groove 30 on the shock absorber may be replaced with protrusion. In such cases, the engagement structure 109 can comprise a groove configured to receive the protrusion.

As will become more fully apparent from the description of the following figures, the engagement structure 109 can be asymmetrically positioned on the inner surface 107 of the preload spacer 100. That is, the engagement structure 109 can be offset from a transverse center plane of the preload spacer 100. Stated another way, the engagement structure 109 can be positioned on the inner surface 107 nearer a first side or end (for example, one of an upper or lower sides or ends) of the preload spacer 100 than a second side or end (for example, the other of the upper or lower side or end) of the preload spacer 100. In some embodiments, this allows the preload spacer 100 to be installed in a first orientation having a first preload or compression setting and a second orientation having a second preload or compression setting.

Installation in either the first orientation or the second orientation, can involve flipping the preload spacer 100 such that a different end faces up. As illustrated in FIG. 2, the preload spacer 100 can include symbols associated with each end that correspond to the different orientation. As illustrated in FIG. 2, the "A" end is oriented upwardly, providing a first orientation. If desired, the preload spacer can be flipped, such that the "B" is oriented upwardly, providing a second orientation. The different orientations are achieved because the engagement structure is asymmetric.

In some embodiments, the preload spacer 100 is made from metal, such as steel or aluminum, although other types of metals as well other non-metal materials can also be used. In one embodiment, the preload spacer 100 is made from 6061-T6 aluminum. In another embodiment, the preload spacer is CNC machined 6061 billet aluminum. The preload spacer 100 can be anodized (e.g., black anodized) to provide a surface that is corrosion resistance and attractive.

Figure 3A:
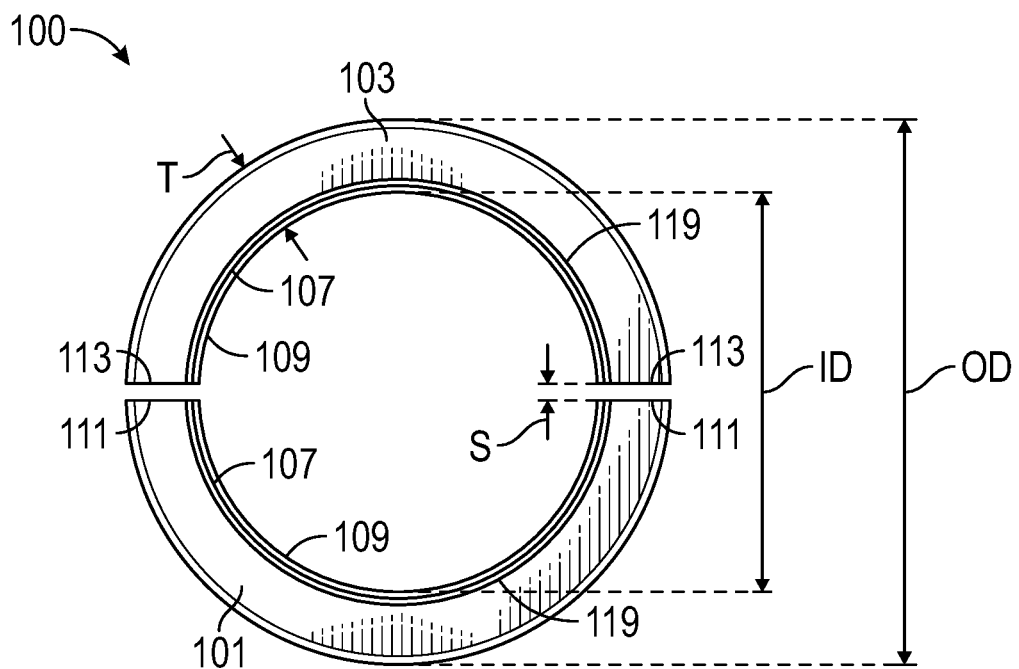
FIG. 3A is a top view of the preload spacer of FIG. 2.
Figure 3B:
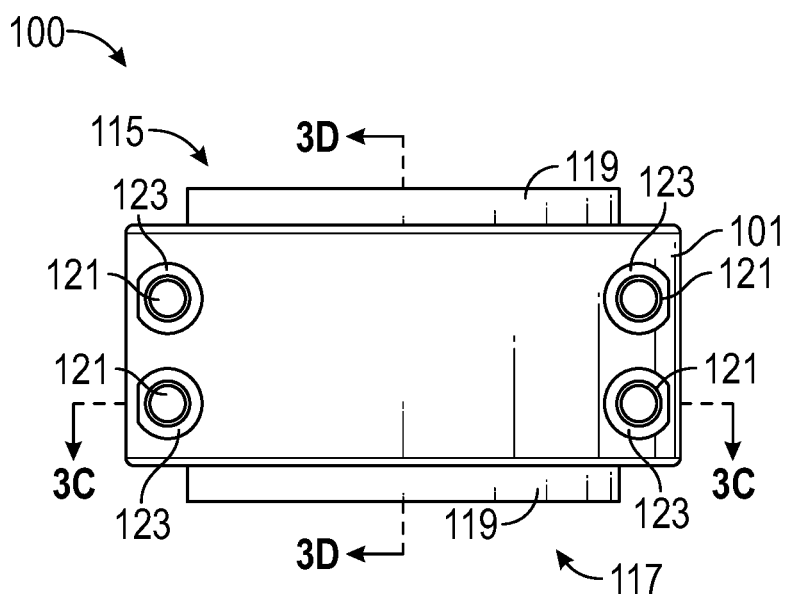
FIG. 3B is a side view of the preload spacer of FIG. 2.
Figure 3C:
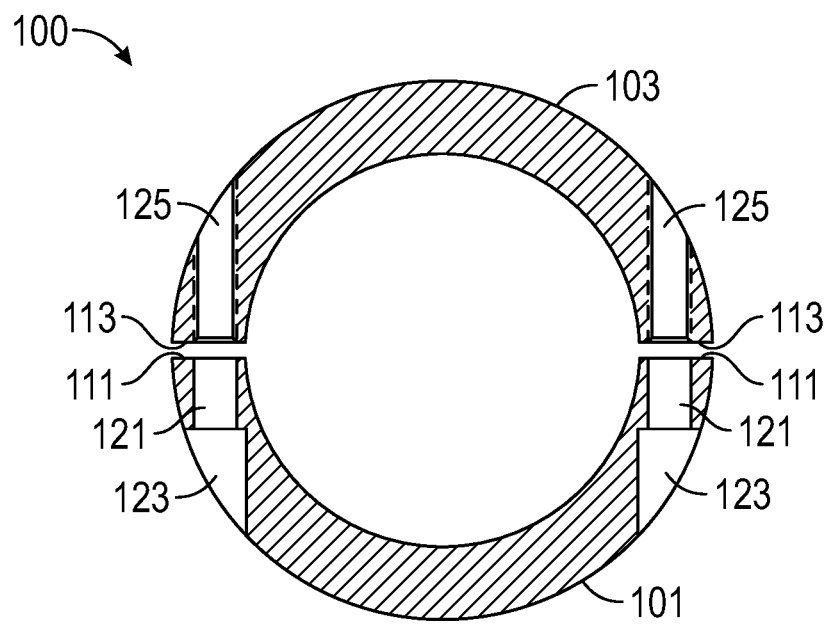
FIG. 3C is a longitudinal cross-sectional view of the preload spacer taken along the line shown in FIG. 3B.
Figure 3D:
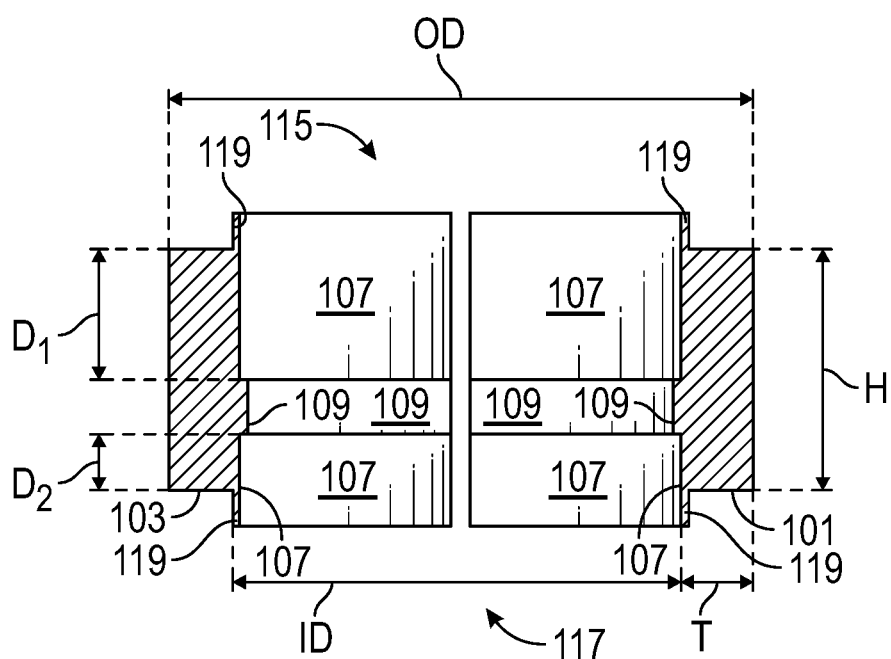
FIG. 3D is a transverse cross-sectional view of the preload spacer taken along the line shown in FIG. 3B.

FIGS. 3A-3D illustrate an example shape for the preload spacer 100 in greater detail. FIG. 3A and FIG. 3B are top and side views of the preload spacer 100, respectively. FIGS. 3C and 3D are longitudinal and transverse cross-sectional views, respectively, taken along the lines shown in FIG. 3B. Although a specific shape is illustrated in FIGS. 3A-3D, those of ordinary skill in the art will appreciate that this is merely one embodiment of a preload spacer 100 and that the shape can be modified in a variety of ways according to the principles of this disclosure.

As shown in FIG. 3A, when assembled, the first portion 101 and the second portion 103 form an annular ring or collar having an inner diameter ID as shown, measured between the inner surfaces 107 of the first and second portions 101, 103. As noted previously, the inner diameter ID can be configured in size and shape to correspond to the outer diameter of the shock tube 16 of the coilover shock absorber 10 onto which the preload spacer 100 will be installed. In some embodiments, the inner diameter ID of the preload spacer 100 is at least, at most, or approximately 1.0 inches, 1.25 inches, 1.5 inches, 1.75 inches, 2.0 inches, 2.25 inches, 2.5 inches, 2.75 inches, 3.0 inches, 3.25 inches, 3.5 inches, 3.75 inches, 4.0 inches, 4.25 inches, 4.5 inches, 4.75 inches, 5.0 inches, 5.25 inches, 5.5 inches, 5.75 inches, 6 inches, 8 inches, 10 inches, 12 inches, or larger, as well as any range and/or value therebetween. In some embodiments, the preload spacer 100 has an outer diameter OD as shown. The outer diameter OD can be greater than the inner diameter ID by a thickness T. In some embodiments, the thickness T is at least, at most, or approximately, 0.125 inches, 0.25 inches, 0.375 inches, 0.5 inches, 0.625 inches, 0.75 inches, 0.875 inches, 1.0 inches, 1.125 inches, 1.25 inches, 1.375 inches, 1.5 inches, 1.625 inches, 1.75 inches, 1.875 inches, 2.0 inches, or larger, as well as any range and/or value therebetween. In some embodiments, the thickness T is at least, at most, or approximately 5%, 10%, 15%, 25%, 30%, or more of the inner diameter ID. Although the thickness T is constant at all positions on the first and second portions 101, 103 in the illustrated embodiment such that the outer shape of the preload spacer 100 is circular, this need not be the case in all embodiments. That is, the outer shape of the preload spacer 100 need not be circular in all embodiments.

In the illustrated embodiment, the first portion 101 comprises a generally semicircular body extending between ends 111. Similarly, the second portion 103 comprises a generally semicircular body extending between ends 113. In some embodiments, when assembled, the first ends 111 are spaced apart from the second ends 113 by a separation distance S. The separation distance S can be at least, at most, or approximately, 0.01 inches, 0.025 inches, 0.05 inches, 0.075 inches, 0.1 inches, 0.125 inches, 0.15 inches, 0.175 inches, 0.2 inches, 0.225 inches, 0.25 inches or larger, as well as any range and/or value therebetween. In some embodiments, separation between the ends 111, 113 allows the first portion 101 and the second portion 103 to be tightened together around the shock tube 16. In some embodiments, the ends 111 contact the ends 113 when assembled.

Each of the first and second portions 101, 103 can comprise a height H as shown, measured along a direction parallel to a central axis of the preload spacer 100. In some embodiments, the height H is at least, at most, or approximately 0.5 inches, 0.75 inches, 1.0 inches, 2.25 inches, 2.5 inches, 2.75 inches, 3.0 inches, 3.25 inches, 3.5 inches, 3.75 inches, 4.0 inches, 4.25 inches, 4.5 inches, 4.75 inches, 5.0 inches or more, as well as any range and/or value therebetween. In some embodiments, the height H is at least, at most, or approximately, 10% the inner diameter ID, 20% the inner diameter ID, 25% the inner diameter ID, 30% the inner diameter ID, 40% the inner diameter ID, 50% the inner diameter ID, or more, as well as any range and/or value therebetween. In the illustrated embodiment, flanges 119 extend axially from first and second sides 115, 117 of the first and second portions 101, 103. The flanges 119 can include an inner face that is collinear with, continuous with, or an extension of the inner surface 107. In some embodiments, the flange 119 on the first side 115 is the same size and shape as the flange 119 on the second side 117. In some embodiments, the flanges 119 can be omitted.

As shown in FIGS. 3B and 3C, the first portion 101 can include boreholes 121 extending therethrough and configured to receive the bolts 105 shown in FIG. 2. As shown in FIG. 3C, the boreholes 121 can extend through and normal to the ends 111 of the first portion 101. In some embodiments, the boreholes 121 are threaded. In some embodiments the boreholes 121 are smooth. Similarly, the second portion 103 can include boreholes 125 extending therethrough to receive the bolts 105 shown in FIG. 2. As shown in FIG. 3C, the boreholes 125 can extend through and normal to the ends 113 of the second portion 103. In the illustrated embodiment, the boreholes 125 are threaded to engage with threaded ends of the bolds 105. In some embodiments, the boreholes 125 can be smooth and the bolts 105 can be secured with nuts, for example. When assembled, boreholes 121 and 125 are aligned. Further, as shown in FIG. 3C, in some embodiments, the boreholes 121 include countersunk portions 123 to receive heads of the bolts 105. In some embodiments, the boreholes 125 can include countersunk portions to receive nuts. In some embodiments, the countersunk portions 123 are omitted. In some embodiments, one or more of the boreholes 121, 125 do not extend entirely through the first and second portions 101, 103, respectively. As noted previously, other methods for attaching the first portion 101 to the second portion 103 (besides the illustrated bolts 105) can be used, including, hose clamps, circlips, hinges, clasps, or other devices or methods.

As shown in FIGS. 3A and 3D, the engagement structure 109 is formed on the inner surface 107 of the preload spacer 100. As noted previously, the shape of the engagement structure 109 is chosen to correspond with the shape of the groove 30 of the shock tube 16 with which the engagement structure 109 will engage. As such, the engagement structure 109 can comprise any shape that corresponds with the shape of the groove 30. Various example shapes for the engagement structure 109 are shown in FIGS. 6A-6H and described below. As shown in the cross-sectional view of FIG. 3D, the engagement structure 109 is asymmetrically positioned on the inner surface 107. That is, in some embodiments, the engagement structure 109 is not centered on the inner surface 107 between the first side 115 and the second side 117. As shown in FIG. 3D, a distance D1 measured between the top of the engagement structure 109 and the top of the first and second portions 101, 103 can be greater than a distance D2 measured between the bottom of the engagement structure 109 and the bottom of the first and second portions 101, 103. For example, in some embodiments, D1 is at least, at most, or approximately 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4 times longer than D2, as well as any range or value therebetween. In some embodiments, the distance D2 can be greater than the distance D1. For example, in some embodiments, the distance D2 is at least, at most, or approximately 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4 times longer than D1, as well as any range or value therebetween.

As will be described in greater detail with respect to FIGS. 7A-7C, the different distances D1 and D2 created by the asymmetrical positioning of the engagement structure 109 on the inner surface 107 provide two different compression or preload settings that can be alternatively selected by varying the installation orientation of the preload spacer 100. For example, depending on the installation orientation of the preload spacer 100, the spring can be additionally compressed (or preloaded) by the distance D1 or D2 when the preload spacer 100 is installed. This additional compression or preload can correspond to an increase in the ride height of the vehicle. In some embodiments, the increase in the ride height of the vehicle is approximately equal to the distance D1 or D2. In some embodiments, the increase in the ride height of the vehicle is proportionally related to the distance D1 or D2 depending on the geometry of the suspension system of the vehicle.

Figure 4A:
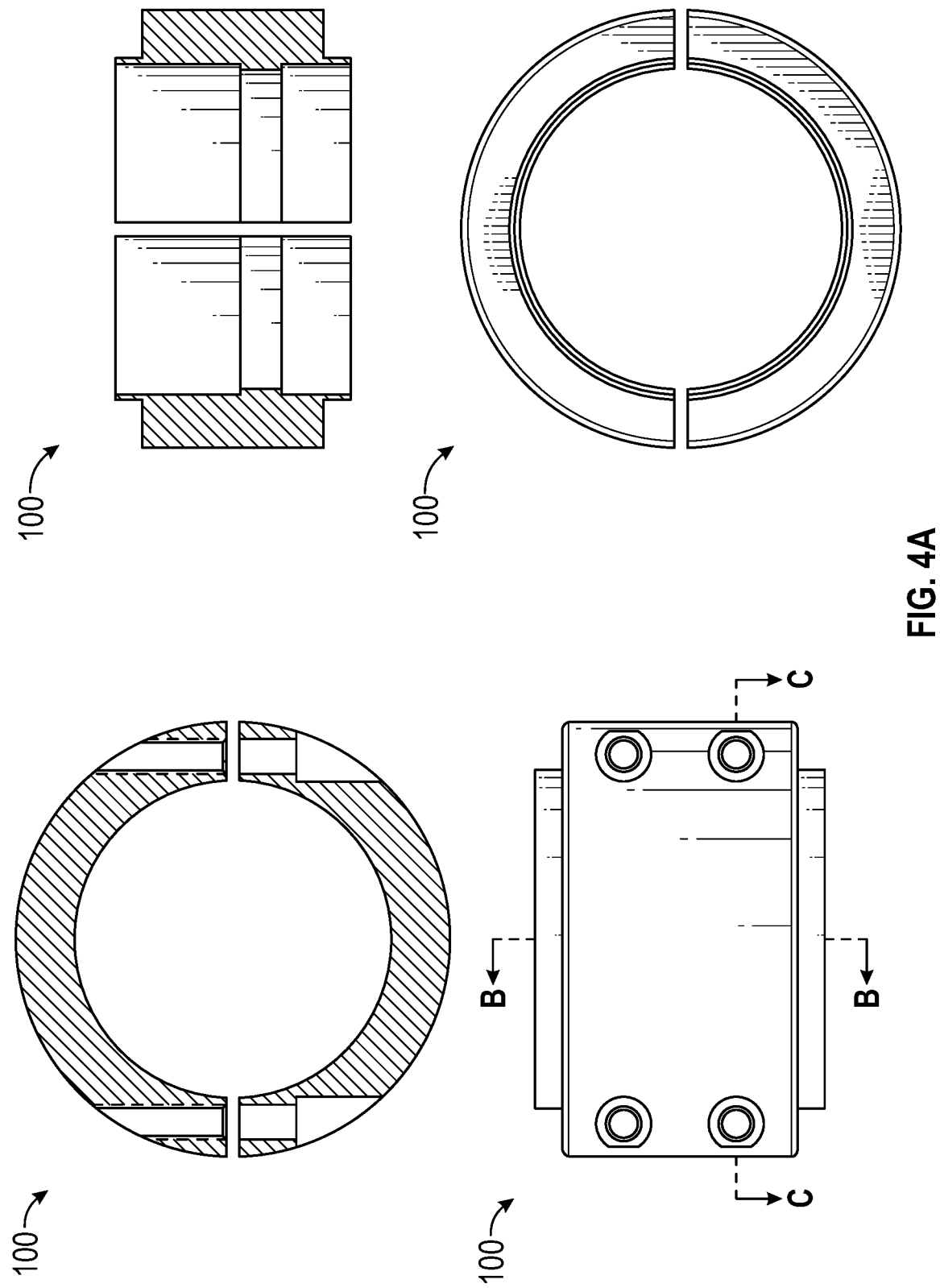
FIG. 4A illustrates various views of an embodiment of a reversible, two setting preload spacer that is secured with four fasteners.
Figure 4B:
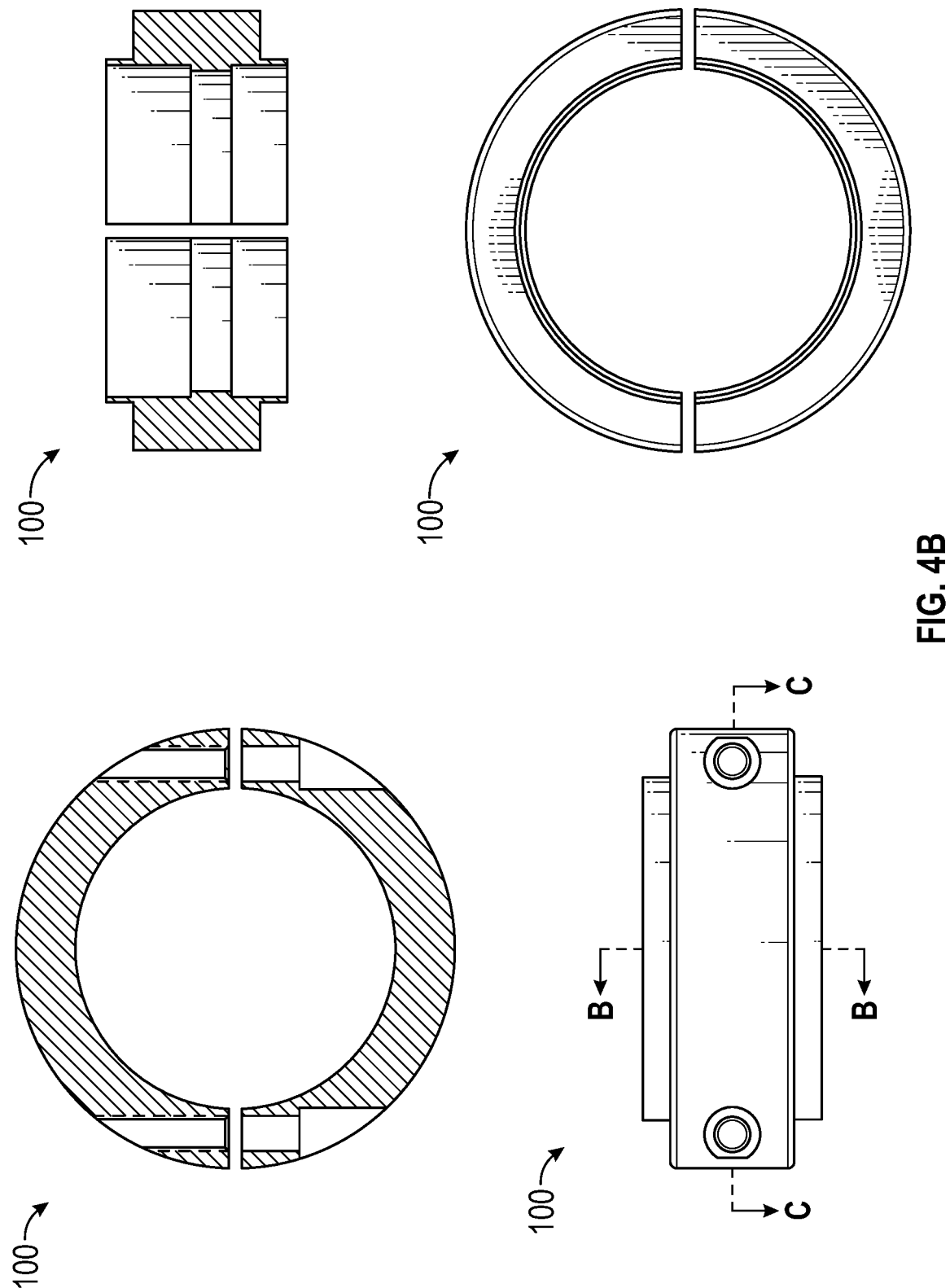
FIG. 4B illustrates various views of an embodiment of a reversible, two setting preload spacer that is secured with two fasteners.

FIG. 4A illustrates various views of an embodiment of a reversible, two setting preload spacer 100 that is secured using four fasteners. FIG. 4B illustrates various views of an embodiment of a reversible, two setting preload spacer 100 that is secured using two fasteners.

Figure 5:
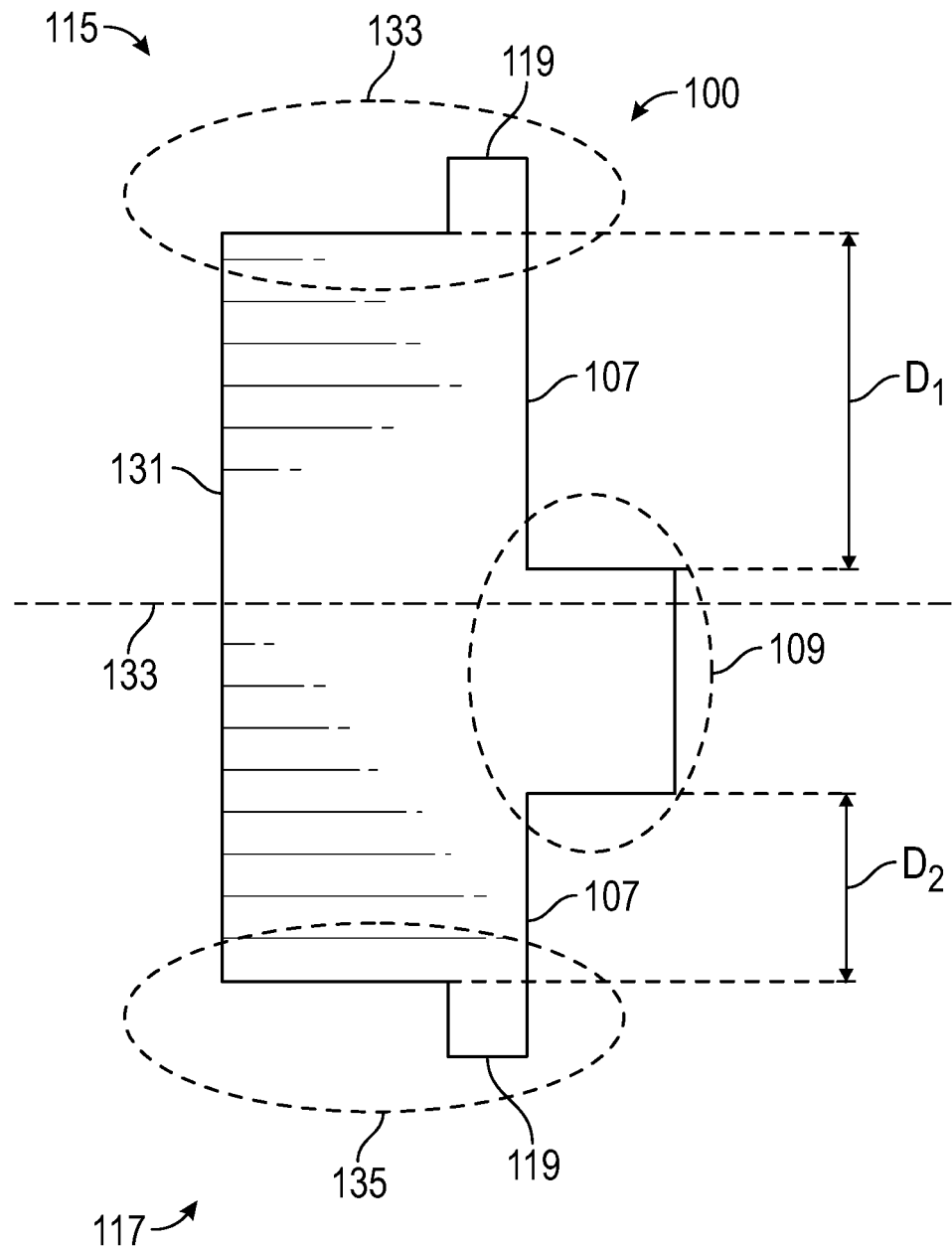
FIG. 5 illustrates a cross-sectional profile of an embodiment of a reversible, two setting preload spacer.

FIG. 5 illustrates a cross-sectional profile 131 of an embodiment of a reversible, two setting preload spacer 100. The profile 131 may be representative of the first portion 101 or the second portion 103 of the preload spacer 100. The shape of the profile 131 illustrated in FIG. 5 is provided by way of example only, and can be modified in a variety of ways according to the principles disclosed herein.

As shown in FIG. 5, the preload spacer includes a first side profile 133 on a first side 115 and a second side profile 135 on a second side 117 of the preload spacer 100. In some embodiments, the first side profile 133 can be a mirror image of the second side profile 135, such that the preload spacer 100 is reversible. In the illustrated embodiment, the first and second side profiles 133, 135 each include a flange 119 that provides an extension of the inner surface 107 as described above. As previously noted, the flange 119 can be omitted. The first side profile 133 and the second side profile 135 are symmetric across the central transverse plane of the preload spacer 100. That is, the shape of the first side profile 133 is the same as the shape of the second side profile 135, although each of the first and second side profiles 133, 135 faces in opposite directions. The shape of each of the first and second side profiles 133, 135 is configured to correspond with, to engage with, and/or to contact the lower spring perch 24 of the coilover shock absorber 10 when the preload spacer 100 is installed. As such, the shape of each of the first and second side profiles 133, 135 may vary in different embodiments according to the shapes of the lower spring perches 24 of various coilover shock absorbers 10.

FIG. 5 also illustrates an example of the engagement structure 109 disposed on the inner surface 107 of the preload spacer 100. Again, the engagement structure 109 can have any shape that corresponds with the groove 30 on a coilover shock absorber 10. As shown in FIG. 5, the engagement structure 109 is asymmetrically positioned on the inner surface 107. That is, the engagement structure 109 is not centered on the inner surface 107. Stated another way, the center of the engagement structure 109 does not lie on the central transverse plane 133 of the preload spacer 100. In some embodiments, a portion of the engagement structure 109 overlaps the central transverse plane 133. In some embodiments, no portion of the engagement structure 109 overlaps the central transverse plane 133. The distances D1 and D2 described above with reference to FIG. 3D are illustrated again in FIG. 5. The distance D1 may be greater than the distance D2, or the distance D2 can be greater than the distance D1.

FIGS. 6A-6H illustrate several cross-sectional profiles for engagement structures 109 for embodiments of reversible, two setting preload spacers 100. As stated throughout this application, the engagement structure 109 is configured to engage with a groove 30 in a coilover shock absorber 10. As different coilover shock absorbers 10 may have different shaped grooves 10, various preload spacers 100 can be provided in different shapes and sizes for use with the different coilover shock absorbers 10. Although FIGS. 6A-6H illustrate several specific profiles for engagement structure 109, these are provided by way of example only and are not intended to be limiting. Those of ordinary skill in the art will understand that these profiles can be varied according to the principles disclosed herein for use with coilover shock absorbers 10 with grooves 30 of all types, shapes, and sizes.

Figure 6A:
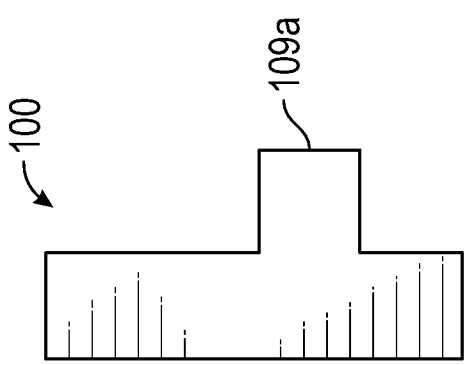
FIGS. 6A-6H illustrate several additional cross-sectional profiles of embodiments of reversible, two setting preload spacers.
Figure 6B:
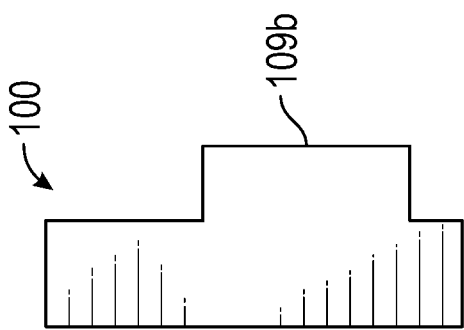
Figure 6C:
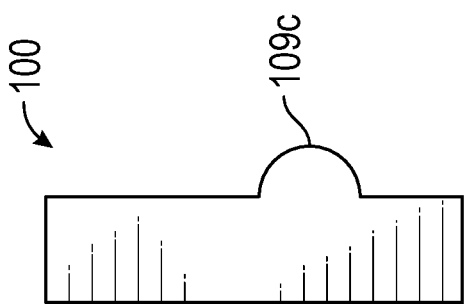
Figure 6D:
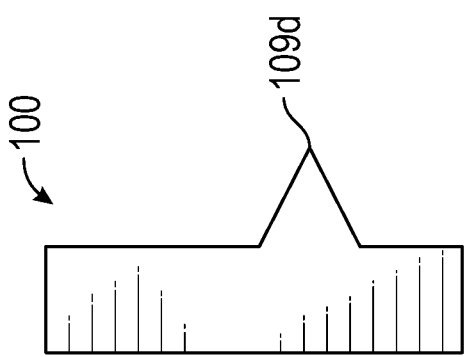
Figure 6E:
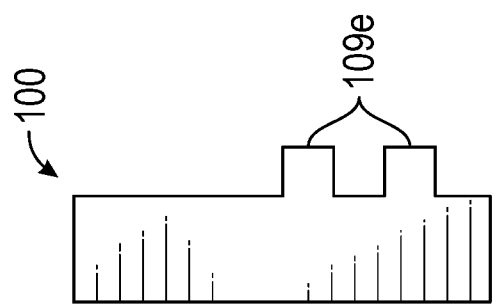
Figure 6F:
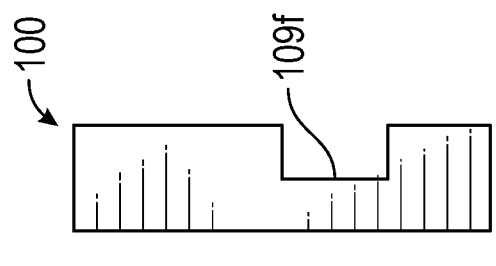
Figure 6G:
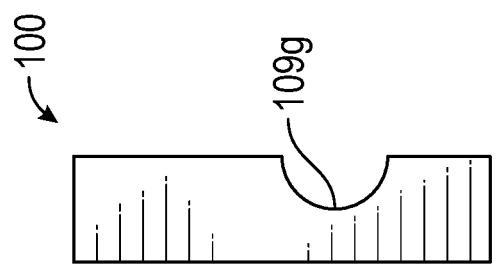
Figure 6H:
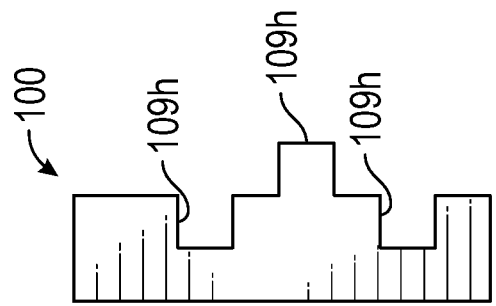

FIG. 6A illustrates an example profile of an engagement structure 109a that includes a square protrusion configured for use with a square groove 30. FIG. 6B illustrates an example profile of an engagement structure 109b that includes a rectangular protrusion configured for use with a rectangular groove 30. FIG. 6C illustrates an example profile of an engagement structure 109c that includes a rounded protrusion configured for use with a rounded groove 30. The engagement structure 109c can include a constant or variable radius. FIG. 6D illustrates an example profile of an engagement structure 109*d* that includes an angled or triangular protrusion configured for use with an angled or triangular groove 30. FIG. 6E illustrates an example profile of an engagement structure 109*e* that includes two protrusions configured for use with two grooves 30. The two protrusions can be of any shape (for example, square, rectangular, rounded, triangular, etc.). FIG. 6F illustrates an example profile of an engagement structure 109*f* that includes an indentation. The indentation can be configured for use with coilover shock absorbers 10 that include a protrusion instead of a groove 30. The indentation can be of any shape (for example, square, rectangular, rounded, triangular, etc.). In some embodiments, the indentation is configured to fit over the clip 28 (see FIGS. 1A and 1B), such that the preload spacer 100 engages with the clip 28 rather than the groove 30. Thus, in some embodiments, the clip 28 may not need to be removed to install the preload spacer 100. FIG. 6G illustrates an example profile of an engagement structure 109*g* that includes a rounded indentation. The engagement structure 109*g* can be similar to the engagement structure 109*f*. FIG. 6H illustrates an example profile of an engagement structure 109*h* that includes both indentations and protrusions. The indentations and protrusions can be of any shape (for example, square, rectangular, rounded, triangular, etc.). Other shapes for the engagement structure 109 are possible.

Figure 7A:
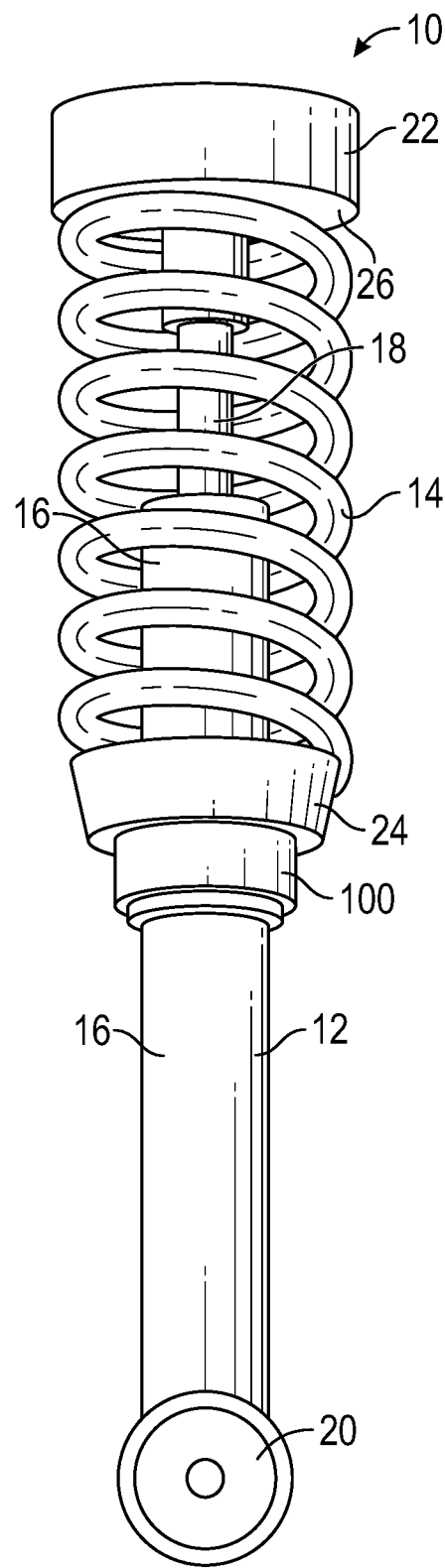
FIG. 7A is an isometric view of an embodiment of a coilover shock absorber with a reversible, two setting preload spacer installed thereon.

FIG. 7A is an isometric view of an embodiment of a coilover shock absorber 10 with the preload spacer 100 installed thereon. The coilover shock absorber 10 of FIG. 7A is similar to the coilover shock absorber 10 of FIG. 1A, except that the preload spacer 100 has been installed in FIG. 7A. Comparing FIGS. 1A and 7A, the preload spacer 100 has been installed in place of (or, in some embodiments, over the top of) the clip 28. The engagement structure 109 of the preload spacer 100 is engaged with the groove 30 of the shock absorber 10, and the preload spacer 100 spaces the lower perch spring 24 above the groove 30 by either the distance D1 or the distance D2 depending on the orientation of the preload spacer 100 (see FIGS. 7B and 7C described below). Accordingly, the preload spacer 100 provides either a first setting or amount of compression or preload of the spring 14 (related to D1) or a second setting or amount of compression or preload of the spring 14 (related to D2) depending on the installation orientation. Further, the additional compression or preload provided by the preload spacer 100 provides either a first or second corresponding increase in the ride of the vehicle that is related to either D1 or D2 depending on the installation orientation. The preload spacer 100 is thus advantageous over other types of spacers that only provide a single setting or amount of preload or compression. Some users may find a two-setting preload spacer 100 advantageous because it provides two options for adjusting vehicle height.

In some embodiments, the preload spacer 100 can advantageously be installed without requiring removal or disassembly of the coilover shock absorber 10. Similarly, reversing the orientation of the preload spacer 100 need not require removal or disassembly of the coilover shock absorber 10. In either case, an example method can include detensioning the spring 14, installing the preload spacer 100 (in the desired orientation) such that the engagement structure 109 is received within the groove 30 on the shock tube 16, and releasing the tension on the spring 14.

FIGS. 7B and 7C are partial cross-sectional views of a portion of the coilover shock absorber 10 with the preload spacer 100 installed in a first orientation and a second orientation, respectively. In the partial cross-sectional view of FIGS. 7B and 7C, the spring 14, lower spring perch 24, and the preload spacer 100 are illustrated as cut along a central longitudinal plane of the coilover shock absorber 10. FIGS. 7B and 7C are similar to FIG. 1B, except in FIGS. 7B and 7C the preload spacer 100 is installed. In each orientation, the engagement structure 109 is engaged with (for example, received within) the groove 30 on the shock tube 16.

In FIG. 7B, the preload spacer 100 is installed in the first orientation. As shown, in the first orientation, the preload spacer 100 is positioned around the shock tube 16 such that the first side 115 of the preload spacer 100 faces upwardly along the shock tube 16 (for example, toward the spring 14). Thus, in the first orientation, the preload spacer 100 spaces the lower spring perch 24 above the groove 30 by the distance D1. This spacing by the distance D1 compresses or preloads the spring 14 by the distance D1, which can create a related increase in the ride height of the vehicle. Please compare FIG. 7B with FIG. 1B (which shows the coilover shock absorber 10 without the preload spacer 100) and FIG. 7C (which shows the coilover shock absorber 10 without the preload spacer 100 installed in the second orientation).

In FIG. 7C, the preload spacer 100 is installed in the second orientation. As shown, in the second orientation, the preload spacer 100 is positioned around the shock tube 16 such that the second side 117 of the preload spacer 100 faces upwardly along the shock tube 16 (for example, toward the spring 14). Thus, in the second orientation, the preload spacer 100 spaces the lower spring perch 24 above the groove 30 by the distance D2. This spacing by the distance D2 compresses or preloads the spring 14 by the distance D2, which can create a related increase in the ride height of the vehicle. Again, please compare FIG. 7C with FIG. 1B (which shows the coilover shock absorber 10 without the preload spacer 100) and FIG. 7C (which shows the coilover shock absorber 10 without the preload spacer 100 installed in the first orientation).

Considering FIGS. 7B and 7C together, the preload spacer 100 can be considered a reversible, two-setting preload spacer 100. For example, the preload spacer 100 can have two-different compression or preload settings: one associated with the first side 115 and the distance D1, and a second associated with the second side 117 and the distance D2. Further, the preload spacer 100 can be reversible because a user can select between the two settings by reversing the orientation of the preload spacer 100. The user can either install the preload spacer 100 with the first side 115 facing upwardly to use the first setting or with the second side 117 facing upwardly to use the second setting. In some embodiments, this is achieved because the preload spacer has a symmetrical outer profile that can engage the lower spring perch 24 on either end and an asymmetrical inner profile (including the engagement structure 109) that engages the groove 30 on the shock absorber 16. As described throughout this application, the different orientations can provide different ride height adjustments.

FIGS. 8A and 8B are top and side views, respectively, of an embodiment of a shock tower shim 200 that can be used with some embodiments of preload spacers 100. In some embodiments, the shock tower shim 200 is included in a kit that also includes the preload spacer 100. As shown, the shock tower shim 200 can comprise a disc 201. The disc 201 may be substantially flat. The disc 201 can include a central opening 203. The disc 201 can also include one or more mounting holes 205 configured to receive fasteners, such as bolts. In some embodiments, the disc 201 may have a thickness of at least, at most, or approximately, 0.125 inches, 0.25 inches, 0.375 inches, 0.5 inches, 0.625 inches, 0.75 inches, 0.875 inches, 1.0 inches, 1.125 inches, 1.25 inches, 1.375 inches, 1.5 inches, 1.625 inches, 1.75 inches, 1.875 inches, 2.0 inches or larger, as well as any value or range of values therebetween. In some embodiments, the shock tower shim 200 is installed between the upper mount 24 of the coilover shock absorber 10 and the shock tower of the vehicle (not shown). Thus, in some embodiments, the shock tower shim 200 does not contribute to the preload of the spring 14, but does increase the ride height of the vehicle by lowering the entire coilover shock absorber 10 relative to the vehicle.

In some embodiments, by providing a preload spacer 100 and a shock tower shim 200, five different levels of vehicle ride height adjustment are possible. Examples of the five ride height adjustments are illustrated in FIGS. 10B-10F. For example, a first increase in vehicle ride height is possible by using the shim 200 alone without the preload spacer 100 (FIG. 10B); a second increase in vehicle ride height is possible by using the preload spacer 100 in the first configuration (represented with side "A" facing up) without the shock tower shim 200 (FIG. 10C); a third increase in vehicle ride height is possible by using the preload spacer 100 in the first configuration (represented with side "A" facing up) with the shock tower shim 200 (FIG. 10D); a fourth increase in vehicle ride height is possible by using the preload spacer 100 in the second configuration (represented with side "B" facing up) without the shock tower shim 200 (FIG. 10E); and a fifth increase in vehicle ride height is possible by using the preload spacer 100 in the second configuration represented with side "B" facing up) with the shock tower shim 200.

FIG. 9 illustrates example dimensions on various views of an embodiment of a shock tower shim 200. Illustrated dimensions are in inches. It will be appreciated that the dimensions shown are merely provided by way of example and are not intending to be limiting in any way. Those of ordinary skill in the art will understand that the illustrated dimensions and overall shape of the shock tower shim 200 and can be varied in a number of ways from the embodiment illustrated in FIG. 9.

FIG. 10 illustrates an example kit 300 that includes two preload spacers 100, two shock tower shims 200, and mounting hardware, including eight bolts 105 (for the preload spacers 100) and six nuts 250 (for the shock tower shims 200). In some embodiments, kits that include two preload spacers 100 and two shock tower shims 200 are configured for installation and the two front wheels or two back wheels of a vehicle. In some embodiments, a kit 300 may include only a single preload spacer 100 and a single shock tower shim 200. In some embodiments, a kit 300 may include four preload spacers 100 and four shock tower shims 200. The kit 300 may also include other items, for example, a thread locker and/or a level.

In the illustrated embodiment, the kit 300 including two preload spacers 100 and two shock tower shims 200 is configured for installation on either the front or rear suspension of a vehicle. In some embodiments the vehicle is a Ford Raptor. In the illustrated embodiment, the preload spacers 100 have the dimensions shown in FIG. 4A. The preload spacers 100 can be installed on the vehicle in either the first orientation or the second orientation and with or without the shock tower shims 200 as discussed above. This may allow for five vehicle height as summarized in Table 1 when installed on a Ford Raptor.

TABLE 1

Figure 10A:
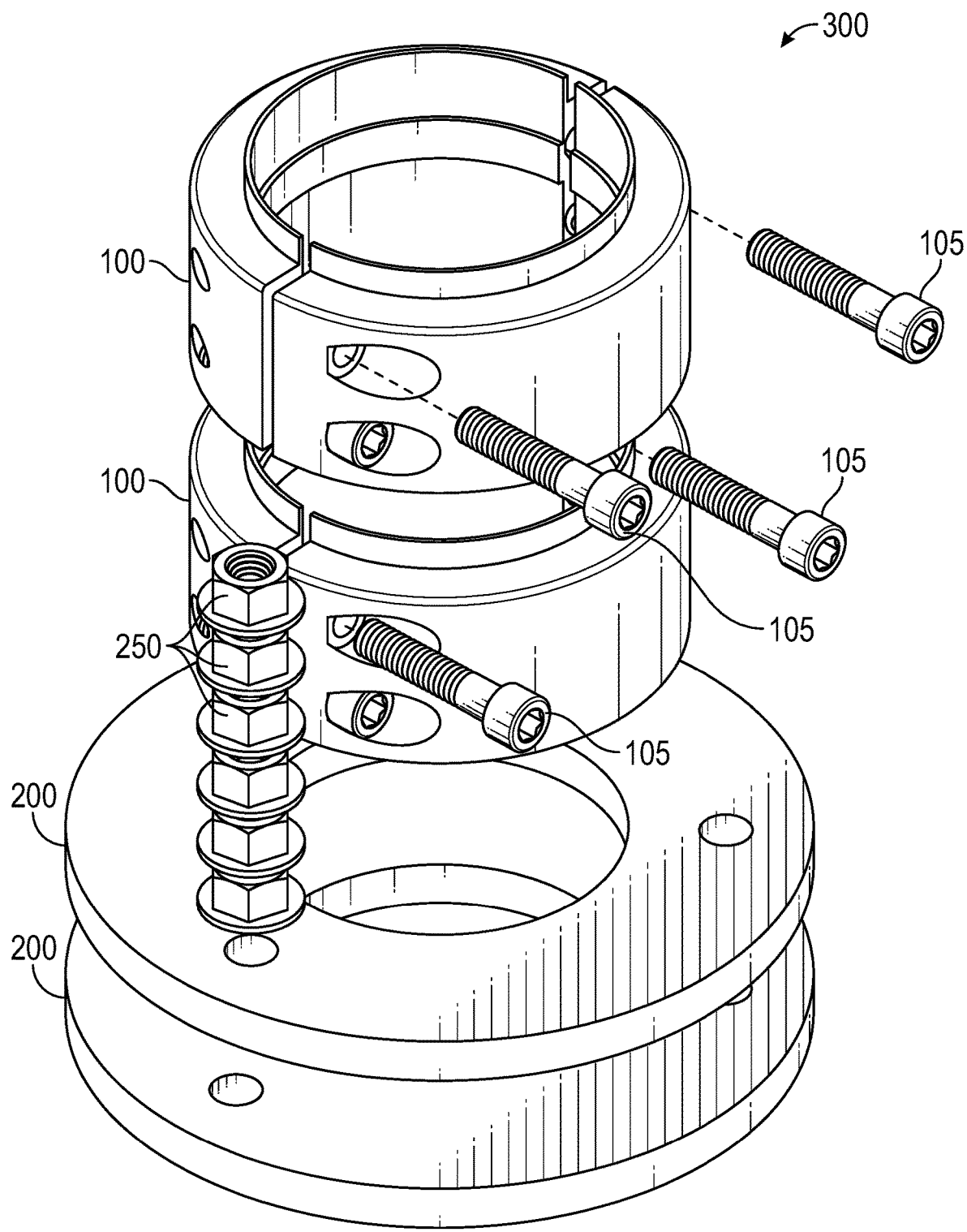
FIG. 10A illustrates an example of a kit that includes two preload spacers, two shock tower shims, and mounting hardware.
Figure 10D:
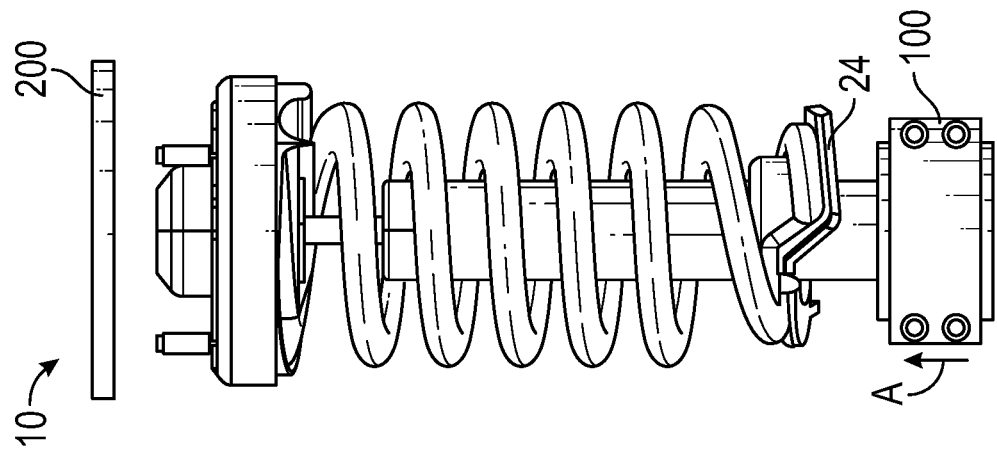
FIGS. 10B-10F illustrate different installation configurations for the kit of FIG. 10A that produce different ride height increases.
Figure 10C:
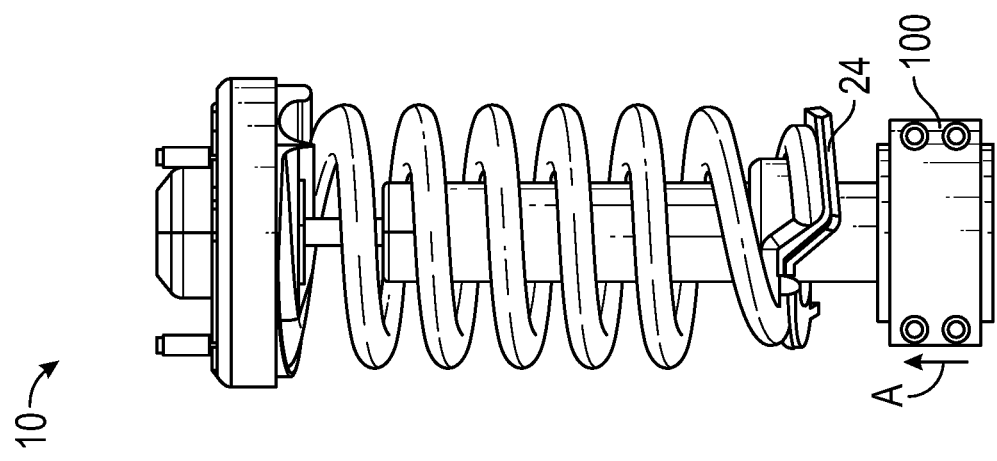
Figure 10B:
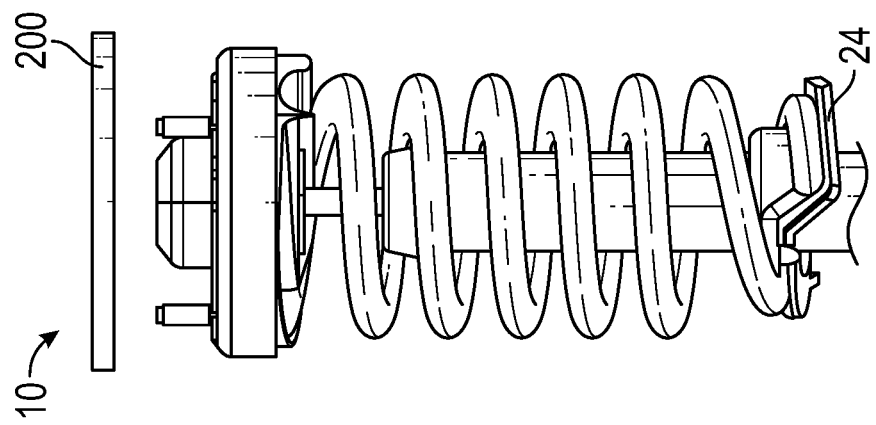
Figure 10E:
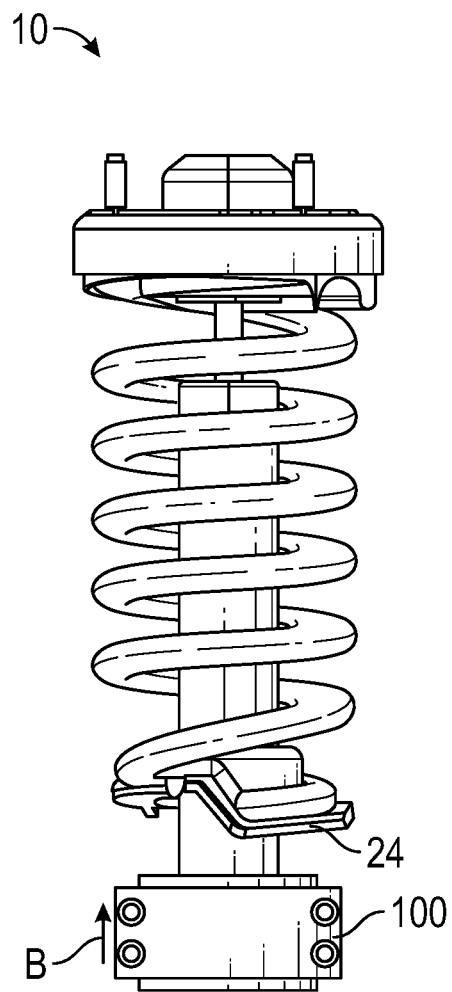
Figure 10F:
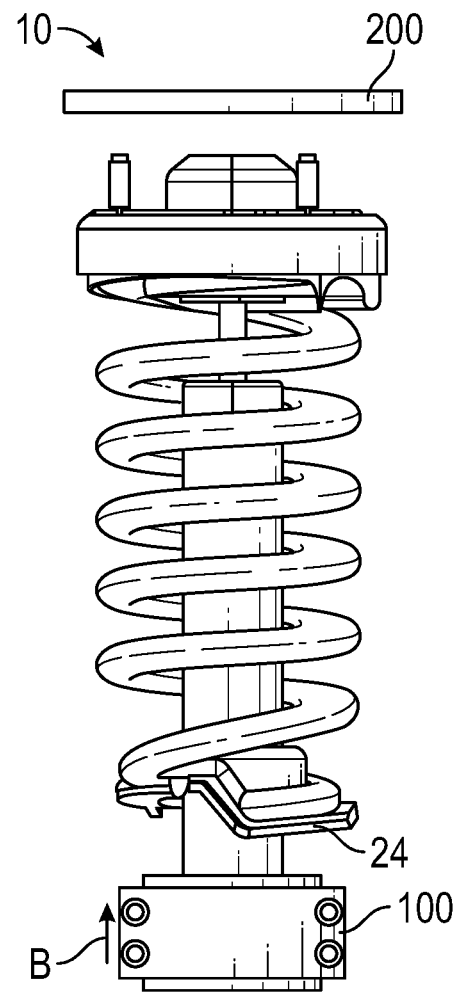

| Example Figure | Configuration (installed on Ford Raptor) | At shock (Inches) | Lift (Inches) | Fender-Hub (Inches) |
|---|---|---|---|---|
| FIG. 10B | Shim alone | 0.375 | 0.50 | 24.50 |
| FIG. 10C | Shim + Preload spacer (1st orientation) | 1.125 | 1.50 | 25.50 |
| FIG. 10D | Preload Spacer alone (1st orientation) | 0.75 | 1.00 | 25.00 |
| FIG. 10E | Preload Spacer along (2nd orientation) | 1.25 | 1.75 | 25.75 |
| FIG. 10F | Shim + Preload spacer (2nd orientation) | 1.625 | 2.25 | 26.25 |

It will be appreciated that the preload spacers 100, shock tower shims 200, and kits 300 described herein can be installed on other types of vehicles and can produce different adjustments in vehicle ride height depending on the dimensions of the preload spacers 100 and shock tower shims 200 as well as on the dimensions of the suspension systems of the vehicles.

Directional terms (e.g., up, down, upper, lower, upwardly, downwardly, inner, outer, etc.) used in several instances in this application are used with reference to the orientation shown in the figures. The use of directional terms is not intended to be limiting as the orientation shown in the figures is not intended to be limiting. Those of ordinary skill in the art will appreciate that the devices and systems described herein can be practiced in a wide variety of orientations. Thus, for example, that which is referred to as upper in one embodiment, may be considered lower in another embodiment.

The foregoing description details certain embodiments of the devices, systems, and methods disclosed herein. It will be appreciated, however, that no matter how detailed the foregoing appears in text, the devices, systems, and methods can be practiced in many ways. The use of particular terminology when describing certain features or aspects of the devices, systems, and methods disclosed herein should not be taken to imply that the terminology is being redefined herein to be restricted to including any specific characteristics of the features or aspects of the technology with which that terminology is associated. It will also be appreciated by those of skill in the art that features or parts included in one embodiment are interchangeable with other embodiments and/or one or more features or parts from an embodiment can be included with any other embodiments in any combination. For example, any of the various features or parts described herein and/or depicted in the figures can be combined, interchanged, or excluded from other embodiments.

It will be appreciated by those skilled in the art that various modifications and changes can be made without departing from the scope of the described technology. Such modifications and changes are intended to fall within the scope of this disclosure. Such modifications will become apparent to those skilled in the art from a consideration of this disclosure or practice of the devices, systems, and methods disclosed herein. Consequently, it is not intended that this disclosure be limited to the specific embodiments disclosed herein, but that it cover all modifications and alternatives coming within the true scope and spirit of the invention as embodied in the claims of this or any related application. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of the attached claims or presentation of new claims in the present application or in a related application. Such amended or new claims, whether they are directed to the same invention or a different invention and whether they are different, broader, narrower, or equal in scope to the original claims, are to be considered within the subject matter of this disclosure.

What is claimed is:

1. A method for adjusting the ride height of a vehicle, the method comprising:
    compressing a spring of a coilover shock absorber;
    removing a clip that supports a lower spring perch of the coilover shock absorber;
    installing a reversible spacer onto the coilover shock absorber in either a first orientation or a second orientation; and
    releasing the compression on the spring.

2. The method of claim 1, wherein installing the reversible spacer comprises selecting either the first orientation or the second orientation.

3. The method of claim 1, wherein installing the reversible spacer in either the first orientation or the second orientation comprises positioning a first end of the reversible spacer toward the lower spring perch or positioning a second end of the reversible spacer toward the lower spring perch, respectively.

4. The method of any of claim 1, wherein installing the reversible spacer comprises engaging a protrusion of the reversible spacer with a groove from which the clip was removed.

5. The method of claim 1, wherein installing the reversible spacer comprises attaching a first portion of the reversible spacer to a second portion of the reversible spacer with one or more fasteners.

6. The method of claim 1, further comprising installing a shim between the coilover shock absorber and a shock tower of the vehicle.

7. The method of claim 6, wherein the shim comprises a disc.

8. The method of claim 1, wherein the reversible spacer comprises:
    a body extending along an axis between a first end and a second end, wherein the body is formed by a first portion and a second portion configured to be attached together, wherein the first portion is separate from the second portion, and wherein the first portion is selectively attachable to the second portion by one or more fasteners;
    an opening formed through the body extending along the axis from the first end to the second end, the opening defined by an inner surface of each of the first portion and the second portion and configured to receive and contact portion of the coilover shock absorber;
    an engagement structure formed on the inner surface of each of the first portion and the second portion, the engagement structure configured to engage a groove on the coilover shock absorber to prevent the body from moving along an axis of the coilover shock absorber, the engagement structure positioned on the inner surface of each of the first portion and the second portion such that a first distance between the engagement structure and the first end is greater than a second distance between the engagement structure and the second end;
    wherein, when installed in the first orientation, the first end contacts the lower spring perch of the coilover shock absorber to cause a first increase in vehicle ride height, and
    when installed in the second orientation, the second end contacts the lower spring perch of the coilover shock absorber to cause a second increase in vehicle ride height.

9. The method of claim 8, wherein a first profile of the first end and a second profile of the second end are symmetric across a plane normal to the axis of the reversible spacer.

10. The method of claim 8, wherein the first end and the second end are configured to alternately engage the lower spring perch of the coilover shock absorber.

11. The method of claim 8, wherein the engagement structure comprises an annular protrusion extending from the inner surface.

12. The method of claim 8, wherein the first portion comprises a first semicircular shape, and wherein the second portion comprises a second semicircular shape.

13. The method of claim 8, wherein, in the first orientation, the reversible spacer causes a first amount of spring preload, and wherein, in the second orientation, the reversible spacer causes a second amount of spring preload.

14. The method of claim 8, wherein, in the first orientation, the device spaces the lower spring perch a first distance above the groove, and wherein, in the second orientation, the device spaces the lower spring perch a second distance above the groove.

15. The method of claim 1, wherein the coilover shock absorber comprises a groove formed in an outer surface of a shock body thereof, and wherein the reversible spacer comprises an engagement structure configured in size and shape to engage the groove in both the first orientation and the second orientation.

* * * * *